Patented Feb. 20, 1951

2,542,288

UNITED STATES PATENT OFFICE 2,542,288

LAMINATE USING POLYAMIDE ADHESIVE

John D. Pickens, Metuchen, N. J., assignor to E. I. du Pont de Nemours & Company, Wilmington, Del., a corporation of Delaware No Drawing. Application April 6, 1944, Serial No. 529,831

3 Claims. (Cl. 154—45.9)

This invention relates to adhesive and plastic compositions and to laminated products and more particularly to improvements in plywood and its manufacture.

A variety of materials have been proposed for use as adhesives in bonding different types of materials together. Some of these have been used commercially but they possess certain disadvantages. Some of the known adhesives are thermoplastic, e. g., linear vinyl polymers of synthetic linear polyamides, and if bonded structures containing this type of adhesive are exposed to temperautres above the softening point of the adhesive, the entire structure fails. Other adhesives are thermosetting and do not soften at elevated temperatures, but these have other disadvantages. Among these disadvantages may be mentioned (1) relatively high curing temperatures are required to obtain satisfactory setting of the adhesive, (2) the amount of adhesive required to obtain satisfactory bond strength is critical and in some cases is excessively high, (3) when such adhesives are applied to wood, the wood must be conditioned to a certain critical moisture content in order to obtain maximum bond strength, and (4) the cured adhesive layer is quite brittle and when used in the manufacture of plywood it is not flexible enough to permit bending the coated plywood veneer around small radii of curvature without breakage. Other types of adhesives have satisfactory bond strength when dry but are water-sensitive and hence unsuitable for uses where the bonded materials are exposed to moisture.

The above mentioned defects in the previously used bonding material are particularly serious in the manufacture of plywood. In the case of the more satisfactory of the bonding materials heretofore used, for example, the phenol-aldehyde type adhesive, the curing temperature required in the early stages of the heat treatment is too high for obtaining best economy in the manufacture of molded plywood. In addition, the relatively high rate at which the adhesive sets prevents its complete uniform bonding between the individual plies, and prevents dissipation of stresses and strains throughout the molded structure which develops under molding conditions.

This invention has as an object the production of new and useful laminated products. A further object is the manufacture of new and valuable laminated articles in which at least one of the laminae is a polymeric organic material having a substantial number of hydrogens attached to elements from group V and VI of the periodic table, particularly cellulosic or other hydroxyl-containing material. A further object is the production of a new and improved plywood product. Another object is the provision of an improved extended nitrogen substituted synthetic polyamide composition. Another object is the provision of an extended nitrogen substituted synthetic polyamide adhesive which permits the inclusion of unexpectedly small amounts of solid resin without sacrifice in the bond strength of the adhesive. A further object is the provision of a means for substantial economies in the new composition, and in the manufacture of laminated articles where the composition is used as an adhesive while maintaining the superior bond strength which characterizes the product. A further object is the provision of a modified nitrogen substituted synthetic polyamide composition which may be applied to a surface by spraying. Still further objects reside in methods for obtaining these articles and products. Other objects will appear hereinafter.

These objects are accomplished in accordance with the present invention by a composition comprising a nitrogen substituted polyamide, known as a N-alkoxymethyl polyamide and a finely divided organic material which is insoluble in the resin vehicle, infusible and not decomposed at the curing temperature of the resin, preferably a cellulosic filler characterized by an oil absorption of not more than about 175. A specific and important embodiment of the invention resides in a laminated product, preferably laminated plywood bonded with the above described extended composition as the adhesive medium.

These N-alkoxymethyl polyamides contain as an integral part of the polymer chain groups of the formula

wherein R is the radical of an alcohol. These nitrogen substituted polyamides, in addition to other properties, differ from the unsubstituted polyamides in that they are thermosetting and not thermoplastic when subjected to curing conditions. They are prepared by treating a linear polyamide which has hydrogen-bearing carbon amide groups with formaldehyde and an alcohol in the presence of an oxygen-containing acid. The acid catalyst can be either an organic acid or a relatively weak inorganic acid, such as the acids of phosphorus, which have an ionization constant less than 2. The reaction can be carried out by heating at about 60° C. a solution of the initial polyamide, for example, polyhexamethylene adipamide, in solution in formic acid with a solution of paraformaldehyde in methanol, and isolating the product.

I have discovered that the N-alkoxymethyl polyamides with the extenders of the present invention are of peculiar utility as the bonding medium for laminating polymeric organic material having a substantial number of hydrogens which are attached to non-metallic elements from groups V and VI of the periodic table, for example, hydroxyl-containing materials such as wood, paper, or fibers and fabrics composed of cellulose or cellulose derivatives containing free hydroxyl groups. This is due, it is believed, to the ability of the N-alkoxymethyl polyamides to react chemically with the hydroxyl groups or other groups which contain active hydrogen of these materials to form exceptionally strong bonds between the different members of the laminated structure. The invention can be carried out by applying a solution of the N-alkoxymethyl polyamide in a suitable solvent preferably containing a small proportion, for example, 0.5–1.0% (based on weight of polymer) of an acid catalyst to the contact surfaces of the laminae by any suitable means, preferably by spraying. A suitable amount of the N-alkoxymethyl solution is that sufficient to give about 2 to 7 pounds of the solid polymer per 1000 square feet of glue line. The coated surfaces are allowed to dry under ordinary atmospheric conditions for at least 2 hours or until the solvent is substantially removed. The coated surfaces are then placed in contact and the entire assembly subjected to a pressure and temperature sufficient to cause the bonding material to become infusible. In the case of plywood made from thin veneer, the plies are pressed at a pressure of 40–200 lbs./sq. in. and heated to a temperature of 110°–120° C. for a period of about 20 minutes. At the end of this treatment the bonded structure can be removed while still hot from the press or mold.

The invention is further illustrated by the following examples, in which the proportions of ingredients are expressed as parts by weight unless otherwise noted.

EXAMPLE 1

*Grinding base*

| | Per cent by weight |
|---|---|
| Polyamide solution[1] | 19.8 |
| Walnut shell flour | 22.7 |
| Denatured alcohol (23A) | 40.2 |
| Water | 17.3 |
| | 100.0 |

*Finished product*

| | Per cent by weight |
|---|---|
| Grinding base (from above) | 70.7 |
| Polyamide solution[1] | 22.2 |
| Denatured alcohol (23A) | 5.0 |
| Water | 2.1 |
| | 100.0 |

[1] The polyamide solution used in this example consisted of a 38.5% solution in a 70:30 by weight alcohol-water mixture of N-methoxymethyl polyhexamethylene adipamide having 11.0% methoxyl and about 0.5% methylol group, which corresponds to an amide substitution of about 51%.

The ratio of solid polyamide to walnut shell flour in the finished adhesive product was about 1:1 parts by weight.

The grinding base was prepared by charging the ingredients into a pebble mill with stone pebbles in the ratio of about 1 part by weight of the base to 2 parts by weight of pebbles and grinding for 18 hours. The final product was obtained by charging additional polyamide solution, alcohol and water into the mill in the proportions shown and grinding continued until a homogeneous composition was obtained.

The finished product was then thinned with a 70:30 mixture of alcohol and water in the ratio of about 100 parts by volume of the composition to about 38 parts by volume of the alcohol-water mixture to a spraying viscosity of about 20 seconds in a Parlin 10 cup (reference: Physical and Chemical Examination of Paints, Varnishes and Lacquers—H. A. Gardner, 1939, p. 224).

A catalyst consisting of maleic acid in an amount of 1% based on the polyamide content of the thinned composition was added with stirring and the material applied to the contact surfaces (one double coat) of $\frac{1}{8}''$ birch veneer to give a coating weight of about 2.6 pounds of solid polyamide per 1000 square feet of glue line. The coated veneer was allowed to dry overnight to permit evaporation of the volatile vehicle. Three veneer plies were then placed together with the center ply in cross-grain relationship with the other two plies and pressed at 200 pounds per square inch at a glue line temperature of 148° C. for a time period of 20 minutes.

The resulting plywood tested in accordance with the procedure described in Army-Navy Aeronautical Specifications AN-NN-P-511b had a dry shear strength of 684 pounds per square inch with 86% wood failure. After the 3-hour boil test the shear strength was 506 pounds per square inch. Both results were far above the minimum specification requirements of 380 pounds dry shear and 290 pounds per square inch shear strength after the 3-hour boil test.

EXAMPLE 2

| | Per cent by weight |
|---|---|
| Grinding base (from Example 1) | 82.1 |
| Polyamide solution[1] | 8.0 |
| Denatured alcohol (23A) | 7.4 |
| Water | 2.5 |
| | 100.0 |

[1] The polyamide solution used in this example was of the same composition as that described in Example 1.

The ratio of the solid polyamide to walnut shell flour was about 1:2 parts by weight.

This adhesive composition was thinned with a 70:30 by weight mixture of alcohol and water in the proportion of about 100 parts by volume of the composition to 28 parts by volume of the alcohol-water mixture to give a spraying viscosity of about 20 seconds in a Parlin 10 cup. A catalyst consisting of maleic acid was added with stirring in an amount of 1% based on the solid polyamide content to accelerate the conversion of the polyamide to the insoluble, infusible state during the bonding operation.

One double coat of the above adhesive was sprayed over the contact surfaces of $\frac{1}{8}''$ birch veneer so as to give a coating weight of about 2.2 pounds of solid polyamide per 1000 feet of glue line. The coating was dried and 3 ply plywood prepared in accordance with the procedure of Example 1. The results of shear strength tests on plywood specimens from this example showed a dry shear of 558 pounds per square inch and a shear strength of 288 pounds per square inch after the 3-hour boil test.

EXAMPLE 3

| | Per cent by weight |
|---|---|
| Ground regenerated cellulose sheeting | 11.6 |
| Polyamide solution[1] | 30.5 |
| Denatured alcohol (23A) | 40.7 |
| Water | 17.2 |
| | 100.0 |

[1] The polyamide solution used in this example consisted of a 38.5% solution in a 70:30 by weight alcohol-water mixture of N-methoxymethyl polyhexamethylene adipamide (45% amide substitution).

The ratio of the finely divided regenerated cellulose particles to solid polyamide is 1:1 parts by weight.

In preparing the regenerated cellulose for incorporation with the polyamide, regenerated cellulose sheeting was reduced to small particles in a Ball & Jewell cutter and then further dry ground in a ball mill with steel balls for 48 hours to give a fine, powdery material. One part by weight of this material was mixed into about 2½ parts of the polyamide solution until a uniform mixture was obtained. A 70:30 by weight mixture of alcohol and water was then added to complete the composition as above and give a viscosity suitable for spray application.

A maleic acid catalyst was added as in Example 1 and 3 ply plywood prepared from 1/16 inch birch veneer in accordance with the procedure and conditions of Example 1 to give a coating weight of 3.3 pounds of solid polyamide per 1000 square feet of glue line. The results of shear strength tests on plywood specimens from this example showed a dry shear of 550 pounds per square inch with about 63% wood failure and a shear strength of 313 pounds per square inch after the 3-hour boil test.

EXAMPLE 4

| | Per cent by weight |
|---|---|
| Polyamide solution[1] | 15.9 |
| Walnut shell flour | 27.8 |
| Denatured alcohol (23A) | 48.4 |
| Water | 7.9 |
| | 100.0 |

[1] The polyamide solution used in this example was the same type as described in Example 1.

The ratio of solid polyamide to walnut shell flour in this composition is about 1:5 parts by weight.

In the preparation of this composition all of the ingredients were charged into a pebble mill containing stone pebbles in the ratio of 1 part by weight of the composition to 2 parts by weight of pebbles and gound for 15 hours. The product was reduced to spraying viscosity of 20 seconds in a Parlin 10 cup in the proportion of about 100 parts by volume of the composition to 20 parts by volume of a thinner consisting of equal parts of alcohol and water. Before applying the adhesive to wood veneer surfaces 1% by weight of maleic acid based on the solid polyamide was added as a catalyst.

One double coat of the thinned and catalyzed composition was applied by spraying to the contact surfaces of 1/16" birch plywood veneer to give a coating weight of about 4.4 pounds of solid polyamide per 1000 square feet of the glue line. The coated veneer was dried overnight at room temperature and then assembled and bonded together by the procedure and under the conditions described for Example 1.

The dry shear strength of the plywood prepared with this composition was 361 pounds per square inch and the shear strength after the 3-hour boil test was 208 pounds per square inch and while this product would not pass requirements for use in aircraft construction, it would be useful for other purposes where shear strength requirements are less stringent such as for office partitions, furniture, etc.

EXAMPLE 5

| | Per cent by weight |
|---|---|
| Polyamide solution[1] | 40.0 |
| Walnut shell flour | 48.0 |
| Denatured alcohol (23A) | 12.0 |
| | 100.0 |

[1] The polyamide solution used in this example consisted of a 40% by weight solution of N-methoxymethyl polyhexamethylene adipamide in a 70:30 by weight mixture of alcohol and water.

The ratio of walnut shell flour to solid polyamide is 3:1 parts by weight.

The composition may be prepared by mixing the ingredients in a kneading machine such as a Werner and Pfleiderer mixer until uniform distribution of the walnut shell flour is obtained.

A small amount of catalyst, i. e., from about 1 to 10% based on the content of the solid polyamide is incorporated with the mixture to promote conversion of the polyamide to the infusible, insoluble state. If the composition is to be employed without the use of heat, catalyst to the amount of between 5 and 10% should be used. This product is of utility as a "plastic wood" and offers several advantages particularly with respect to low shrinkage characteristics, thus distinguishing from the conventional "plastic wood" products now on the market which require larger amounts of binder for the ordinary wood flour used heretofore with consequent greater shrinkage. For this modification, the fillers or extenders should be present in an amount of at least 2 parts by weight of extender to 1 part by weight of polyamide and for best results the extender should be present in amounts between 3 and 5 parts by weight of extender to 1 part by weight of polyamide.

The compositions of the invention may comprise the polyamide and extenders of the type hereinbefore described in the proportion of between about 1 and 5 parts by weight of extender to about 1 part by weight of the polyamide. For best results particularly when the compositions are employed as adhesives for plywood manufacture for aircraft construction, the extender is preferably present in the proportion of about 1 to 3 parts by weight to about 1 part by weight of the polyamide. If the extender content is substantially greater than about 5 parts by weight to 1 part by weight the adhesive properties of the polyamide are adversely affected and if the extender content is reduced much below an amount equal to the polyamide content, application difficulties are encountered and economies and required film thickness in single coat application are sacrificed.

At the low coating weights of solid polyamide binder, an extender consisting of walnut shell flour was found to contribute positive improvements in joint strength as shown in the following table of results on specimens prepared according to the procedure and conditions of Example 1:

| Extender: Walnut Shell Flour, Ratio to solid Polyamide | Coating Weight: Lbs. solid polyamide for 1000 sq. feet of glue line | Dry Shear, Lbs./sq. in. | Shear after 3-hr. boil test, Lbs./sq. in. |
|---|---|---|---|
| 1:1 | 2.6 | 684 | 506 |
| 1:1 | 1.8 | 586 | 403 |
| None | 2.4 | 457 | 0 |

The extenders of the present invention also offer an unexpected advantage in spray application operation since an unextended but otherwise identical composition could not be sprayed without serious "webbing" except at very low concentrations, whereas with a polyamide solution modified with the extenders of the present invention this tendency was entirely eliminated even with the relatively high solids contents shown in the examples. The unextended adhesives at the low solids content also tend to penetrate the wood veneer excessively and this gives poor joint strengths unless a considerable number of coats are applied, thus increasing operating and material costs.

As previously indicated the extenders of the present invention consist of a finely divided, organic material, preferably a cellulosic material characterized by an oil absorption of not more than about 175 and preferably less than 150. Suitable materials include walnut shell flour (oil absorption: Glufil grade—115, Tex-shel grade—124), apricot shell flour (oil absorption: 76), finely ground regenerated cellulose (oil absorption: 78), dry ground corn cob flour (oil absorption: 92), dry ground redwood flour (oil absorption: 92) and dry ground redwood plastic pulp (oil absorption: 52). The dry grinding of these materials may be carried out by grinding the commercial corn cob flour or redwood flour in a ball mill for 18–36 hours with steel balls. Conventional wood flour, specially treated by ball mill dry grinding of about 18 to 36 hours to compact the structure and reduce its oil absorption characteristic to 139 is also satisfactory. Conventional wood flour which is merely comminuted to small particles and not ground so as to compact its structure as indicated above has an oil absorption of 319 and is not satisfactory. Oil absorption determinations were made in accordance with the standard "rub-out" method described in "Physical and Chemical Examination of Paints, Varnishes and Lacquers"—H. A. Gardner, 1939, p. 209.

As has been previously pointed out, the present invention is of peculiar utility in the production of laminated articles in which one or more of the laminae is an active hydrogen-containing material, particularly a hydroxyl-containing material since the N-alkoxymethyl polyamide binder actually reinforces such material by reason of the chemical action which takes place between it and the polymer. A particularly valuable embodiment of this invention, with regard to both the improved properties obtained in the product and to the practical advantages in manufacture, is the preparation of plywood structures. The rate at which the extended N-alkoxymethyl polyamides set up is not as fast as that for the phenol-formaldehyde resins. This slower rate enables the adhesive to spread uniformly between the individual plies and thus produce perfectly uniform bonding throughout the structure. In addition, the initial plasticity of the adhesive is sufficient to dissipate any strains and stresses which may develop in the structure during the bonding operation, especially with curved structures. This is an important factor in obtaining the highest possible bond strength and avoids cracking and bridging of the plies in molded plywood, particularly in the preparation of curved structures. A further valuable advantage resides in the fact that the N-alkoxymethyl polyamides become infusible after curing, e. g., heating at an elevated temperature, suitably about 100° C. or above, and preferably in the presence of an acid catalyst. There is no plastic flow in the plywood structures after removal from the press. This lack of plastic flow under stress, even at temperatures as high as 180° F. eliminates delamination tendencies and slippage at the glue line, defects which greatly reduce the utility of many previously available adhesives. An additional advantage in the preparation of plywood is that the moisture content of the wood is not critical and alternating wet and dry conditions can be tolerated.

Other examples of laminae which comprise hydroxyl-containing material and which for the reasons previously given are of special utility in the practice of this invention are paper, cotton fabric, rayon, regenerated cellulose film, hydrolyzed vinyl ester polymers and interpolymers and cellulose acetate or other polymers in which there are present substantial numbers of hydrogens which are attached to oxygen, nitrogen and sulfur, such as in nylon, cellulose derivatives, polymeric thiol compounds, etc. In all of these, the active —OH, NH, and —SH groups probably enter into a chemical reaction with the N-alkoxymethyl polyamide binder. Although laminae consisting of materials not containing active hydrogen yield with the present polymer interlayer a weaker bond than is desired for the improved laminated wood products described herein, articles of utility can be obtained with laminae not containing active hydrogen. Examples of such laminae are leather, and plastics such as polyvinyl chloride, polymethacrylates, etc.

The N-alkoxymethyl polyamides mentioned in the examples can be replaced by any of the large number of the polymers of this kind obtainable by reacting various alcohols in the manner previously pointed out with different polyamides containing hydrogen-bearing amide groups obtained from reactants of the kind described in United States Patents 2,071,250, 2,071,253 and 2,130,948, namely from monoaminomonocarboxylic acids, and mixtures, in equimolecular amount, of dibasic carboxylic acid with either a diamine or a monoaminomonohydric alcohol. The polyamide from which the N-alkoxymethyl polyamide is derived can, in addition to the hydrogen-bearing amide groups, contain non-hydrogen-bearing amide groups, as in the case of the polyamides obtained by reacting a mixture of diprimary and disecondary diamines, it being understood that these reactants can be replaced by their amide-forming derivatives. Although the N-alkoxymethyl polyamides derived from polyhexamethylene adipamide are particularly useful for the present purpose, the initial polyamide from which the N-alkoxymethyl polyamide is obtained can be that obtained from any of numerous other polyamide-forming reactants. One or more of such dibasic carboxylic acids as glutaric, pimelic, suberic, azelaic, sebacic, carbonic 1,2-cyclohexan diacetic, para-phenylenediacetic, and diglycolic acids can, for example, be reacted with one or more of the following diamines: ethylenediamine, tetramethylene diamine, octamethylene diamine, decamethylene diamine, p-xylylene diamine, triglycol diamine. Examples of suitable amino acid polyamides are those obtained from such primary monoaminocarboxylic acids as 6-aminocaproic, 12-aminostearic, and 4-aminocyclohexylcarboxylic acids. Interpolyamides are also valuable for making derivatives suitable for use in this invention. Typical are those which can be made from a mixture of the just cited polyamide-forming compositions, e. g., from a mixture of two diprimary diamines with one or more dibasic carboxylic acids. Other interpolymers are those obtained by reacting a polyamide-forming composition with another polymer-forming composition, e. g., a polyester-forming composition.

The alkoxy groups in the N-alkoxymethyl polyamides can be derived from a variety of alcohols, e. g., ethanol, propanol, butanol, cyclohexanol, furfuryl alcohol, methoxymethyl alcohol, beta-ethoxyethanol, octyl alcohol, lauryl alcohol, benzyl alcohol, unsaturated alcohols such as allyl alcohol and oleyl alcohol, alcohols containing additional functional groups such as methyl glycolate and ethanol formamide, di- and polyhydric alcohols such as ethylene glycol and glycerol, and ethyl chlorohydrin.

The N-alkoxymethyl polyamides used in the practice of this invention can vary somewhat widely in degree of substitution which for optimum results will depend on the specific alkoxy group in the polymer. With N-methoxymethyl polyhexamethylene adipamide, derivatives in which more than about 30% of the amide groups are substituted, are suitable for the present purpose. Derivatives of less than 30% substitution are less satisfactory because they have poorer solubility in common solvents and they give inferior water-resistance in the bond. The preferred degrees of substitution are from 45 to about 55%. These substituted polyamides in this range in general have preferred solubility, stability of solution, and thermosetting properties. N - methoxymethyl polyhexamethylene adipamides of 30–45% substitution give satisfactory bonding but their solutions are relatively unstable, that is, they tend to gel rapidly at ordinary temperatures. N-methoxymethyl polyamides of more than 55% substitution can also be used, but they are harder to isolate from their reaction mixtures. With higher alkoxymethyl polyamides, somewhat lower degrees of substitution are satisfactory. For example, a N-ethoxymethyl polyhexamethylene adipamide having 36% of its amide groups substituted is just as effective in bonding action as a N-methoxymethyl polyhexamethylene adipamide of 50% substitution. However, N-ethoxymethyl polyhexamethylene adipamides of about 20–32% substitution form unstable solutions.

The N-alkoxymethyl polyamides as customarily prepared also contain some hydroxymethyl radicals on the amide groups. It is preferred that the proportion of hydroxymethyl groups be relatively small. For example, N-methoxymethyl polyamides containing a ratio of 7 methoxymethyl groups to 1 hydroxymethyl group have been found suitable in the practice of this invention but it is preferred that the ratio be of the order of 20:1. The amount of hydroxymethyl substitution of the amide nitrogen atom is included in the values of total amide substitution mentioned in the preceding paragraph.

N-alkoxymethyl polyamides extended as previously described of both high and low viscosities give uniformly excellent bond strength in plywood. Therefore, any viscosity which gives a coating composition of suitable working characteristics when applied on the contact surfaces of the materials to be bonded is suitable.

The extended N-alkoxymethyl polyamide bonding material can be cured under a wide variety of conditions. The time and temperature of heat treatment depend on the presence or absence of a catalyst. The bond can be rendered insoluble and infusible by heating at temperatures of 140°–165° C. or higher temperatures below the decomposition point of the polymer for 20 minutes to 1 hour when no catalyst is used. However, the temperature of curing can be lowered, or the time shortened, by the use of catalysts. When suitable catalysts are used the adhesive can be cured at temperatures as low as ordinary room temperature. For example, the extended N-methoxymethyl polyhexamethylene adipamide adhesive catalyzed with 1% of its weight of maleic acid is cured in 30 minutes at 100° C. or in 5 minutes at 143° C.; with 2% maleic acid the bond is cured in 3 weeks at room temperature (20° to 30° C.) and with 10% of this catalyst it is cured in 16 to 20 hours at 25° C. Likewise, a similar extended N-methoxymethyl polyhexamethylene adipamide adhesive catalyzed with 2% of its weight of p-toluene sulfonic acid is cured in 2 weeks at room temperature (25° to 30° C.) and the resulting bonds withstand exposure to boiling water for 3 hours.

The activation of the adhesive composition to bring about the curing of the composition may be carried out by the use of high frequency current according to the process described in Pitman Reissue Patent 22,301.

Catalysts for the curing of the extended N-alkoxymethyl bonding material can be acids or acid-reacting salts. The preferred catalysts are acids having ionization constants equal to or greater than $1 \times 10^{-2}$ at 25° C. Acids having ionization constants of $2 \times 10^{-4}$ or even lower can be used but they are not as effective. Examples of suitable acids are maleic, p-toluene sulfonic, phosphoric, oxalic, and trichloroacetic acids. The preferred concentrations of these catalysts are from 0.5 or 1% to 10% of the weight of the N-alkoxymethyl polyamide. With weak acids such as sebacic or adipic acid, higher concentrations, higher temperatures of curing, or longer times of curing are used to obtain satisfactory bonding. When the bonding material is to be applied to wood it is preferred that the catalyst impart to the solution a pH of not less than about 3. Examples of salts which are effective as catalysts are ammonium chloride, monosodium phosphate, sodium bisulfate, or others having an acid reaction in aqueous solution. Acid esters such as ethyl acid phosphate can also be used.

The moisture content of wood to be bonded with the extended N-alkoxymethyl polyamides is not critical. Uniformly excellent bond strengths are obtained with wood containing from 3 to 25% moisture. However, when wood of high moisture content, e. g., 25%, is used, it is necessary to use a slightly higher concentration of catalyst, or slightly higher curing temperature, or longer curing time than when wood of lower moisture content is used.

The bonding solution can be prepared with any solvents known for the N-alkoxymethyl polyamide. The preferred solvent will depend on the degree of substitution of the polymer and the type of substituent group. Aqueous ethyl alcohol of about 70% concentration has been described in the examples. Other concentrations ranging from 60 to 100% ethyl alcohol can also be used with certain polymers. The ethyl alcohol can be replaced by aqueous methanol, propanol, or butanol as desired. Chloroform-alcohol mixtures can also be used for N-alkoxymethyl polyamides of a high degree of substitution.

The extended N-alkoxymethyl polyamides can be used as the bonding medium in other form than in solution. A preformed film of polymer may be placed between the contact surfaces of the articles to be bonded. Another method of application is to coat or impregnate paper, regenerated cellulose film, or a fabric with the extended N-alkoxymethyl polyamide solution, evaporate the solvent, and use the dried, coated or impregnated sheet or fabric in the same manner as a film of the extended polymer. In this method the paper or fabric may be coated or impregnated with the adhesive solution containing the catalyst or the catalyst can be applied by spraying or other means to the dry impregnated paper or fabric prior to use.

Examples of other polymeric materials which can be incorporated with the extended alkoxymethyl polyamide are the following: phenol-formaldehyde resins of various types, certain alkyd resins such as linseed oil modified or castor oil modified, butanol modified urea-formaldehyde resins, mixed glycerides of unsaturated fatty acids and beta-furylacrylic acid, hydrolyzed ethylene/vinyl acetate interpolymers (either partially or completely hydrolyzed), polyvinyl butyral resins, styrene-maleic anhydride resins, terpene-maleic anhydride resins, sulfonamide-formaldehyde resins, bismethoxymethylurea, and rosin-containing materials. These materials can be used in various proportions depending on the compatibility of the particular modifier being used and the properties desired in the final adhesive.

From the foregoing description it will be apparent that laminated products, and particularly plywood structures, of unusual strength can be obtained by the practice of this invention wherein the rate of cure of the bonding agent in the early stages of the heat treatment in sufficiently slow to permit the bonding layer to spread uniformly between the different plies thereby obtaining uniform contact of the different surfaces, dissipating stresses and strains and that the extended N-alkoxymethyl bonding agent disclosed herein finally sets up to an infusible polymer which does not posses any thermoplasticity. A particular advantage of the new compositions resides in the exceptionally high amounts of the specific types of filler which may be tolerated thus offering marked economies and enabling the spray application of the compositions at greater solids content. An unexpected advantage is apparent in the improved joint strengths provided by the inclusion of the present extenders as compared to the unextended polyamides when applied at approximately the same solid polyamide coating weights.

As many apparently widely different embodiments of this invention may be made without departing from the spirit and scope thereof, it is to be understood that I do not limit myself to the specific embodiments thereof except as defined in the appended claims.

I claim:

1. A laminated product comprising at least 2 cellulose sheet material plies bonded by a composition comprising an alcohol soluble linear N-alkoxymethyl polyamide obtained by heating a linear polycarbonamide which has hydrogen-bearing amide groups as an integral part of the polymer chain and in which the average number of carbon atoms separating the amide groups is at least two, with formaldehyde and an aliphatic monohydric alcohol in the presence of an oxygen-containing acid until 30 to 55% of the said hydrogen bearing amide groups have been reacted, a finely soluble cellulosic extender which is infusible and not decomposable at the curing temperature of the polyamide uniformly dispersed therein and characterized by an oil absorption of less than 175 and an acid reacting catalyst having an ionization constant greater than $2 \times 10^{-4}$.

2. The product of claim 1 in which the oil absorption is between about 50 and 150.

3. The product of claim 1 in which the plies are wood veneer.

JOHN D. PICKENS.

REFERENCES CITED

The following references are of record in the file of this patent:

UNITED STATES PATENTS

| Number | Name | Date |
|---|---|---|
| 2,132,671 | Bauer | Oct. 11, 1938 |
| 2,191,367 | Carothers | Feb. 20, 1940 |
| 2,244,184 | Austin | June 3, 1941 |
| 2,319,182 | Von der Pyl | May 11, 1943 |
| 2,343,497 | Cosgrove | Mar. 7, 1944 |
| 2,373,135 | Maxwell | Apr. 10, 1945 |
| 2,374,126 | Peters | Apr. 17, 1945 |
| 2,393,972 | Caerns | Feb. 5, 1946 |
| 2,412,993 | Larchar | Dec. 24, 1946 |
| 2,413,697 | Edgar | Jan. 7, 1947 |
| 2,430,860 | Cairns | Nov. 18, 1947 |
| 2,443,450 | Graham et al. | June 15, 1948 |
| 2,461,900 | Johnson | Feb. 15, 1949 |

OTHER REFERENCES

Plastics Catalog, 1943, pages 231, 240, 242.
Plastic Trends, page 7, Sept. 15, 1943.

Certificate of Correction

Patent No. 2,542,288 February 20, 1951

JOHN D. PICKENS

It is hereby certified that error appears in the printed specification of the above numbered patent requiring correction as follows:

Column 1, line 13, for "temperautres" read *temperatures*; line 36, for "material" read *materials*; column 5, line 60, for "gound" read *ground*; column 11, line 53, for the word "in" read *is*; line 60, for "posses" read *possess*; column 12, line 28, after "finely" insert *divided*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*